(12) United States Patent
Lochhaas et al.

(10) Patent No.: US 9,567,450 B2
(45) Date of Patent: Feb. 14, 2017

(54) METHOD OF BONDING A FLUOROELASTOMER COMPOUND TO A METAL SUBSTRATE USING LOW MOLECULAR WEIGHT FUNCTIONAL HYDROCARDONS AS BONDING PROMOTER

(75) Inventors: Kai H. Lochhaas, Neuötting (DE); Klaus Hintzer, Kastl (DE); Dirk H. C. Arren, Wijnegem (BE); Karl Eberl, Burgkirchen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 399 days.

(21) Appl. No.: 14/238,124

(22) PCT Filed: Aug. 3, 2012

(86) PCT No.: PCT/US2012/049443
§ 371 (c)(1),
(2), (4) Date: Apr. 24, 2014

(87) PCT Pub. No.: WO2013/022729
PCT Pub. Date: Feb. 14, 2013

(65) Prior Publication Data
US 2014/0227532 A1 Aug. 14, 2014

(30) Foreign Application Priority Data

Aug. 11, 2011 (EP) .................................... 11177265

(51) Int. Cl.
| | |
|---|---|
| B32B 15/06 | (2006.01) |
| C08F 214/18 | (2006.01) |
| C08K 5/06 | (2006.01) |
| C08K 5/101 | (2006.01) |
| C08K 5/11 | (2006.01) |
| C08K 5/13 | (2006.01) |
| C09K 3/10 | (2006.01) |
| B32B 15/08 | (2006.01) |
| B32B 27/30 | (2006.01) |
| C09J 127/16 | (2006.01) |
| B32B 37/26 | (2006.01) |
| B32B 27/20 | (2006.01) |
| C08K 5/14 | (2006.01) |

(52) U.S. Cl.
CPC ................ *C08K 5/11* (2013.01); *B32B 15/06* (2013.01); *B32B 15/08* (2013.01); *B32B 27/20* (2013.01); *B32B 27/304* (2013.01); *B32B 37/26* (2013.01); *C08K 5/06* (2013.01); *C09J 127/16* (2013.01); *C09K 3/1009* (2013.01); *B32B 2264/108* (2013.01); *B32B 2307/536* (2013.01); *B32B 2307/54* (2013.01); *B32B 2307/554* (2013.01); *B32B 2307/584* (2013.01); *B32B 2581/00* (2013.01); *C08K 5/101* (2013.01); *C08K 5/13* (2013.01); *C08K 5/14* (2013.01); *Y10T 428/3154* (2015.04)

(58) Field of Classification Search
None
See application file for complete search history.

(56) References Cited

U.S. PATENT DOCUMENTS

| | | |
|---|---|---|
| 2,559,752 A | 7/1951 | Berry |
| 3,753,937 A | 8/1973 | Stivers |
| 3,876,654 A | 4/1975 | Pattison |
| 4,000,356 A | 12/1976 | Weisgerber et al. |
| 4,214,060 A | 7/1980 | Apotheker et al. |
| 4,233,421 A | 11/1980 | Worm |
| 4,243,770 A | 1/1981 | Tatemoto et al. |
| 4,831,085 A | 5/1989 | Okabe et al. |
| 4,912,171 A | 3/1990 | Grootaert et al. |
| 5,086,123 A | 2/1992 | Guenthner et al. |
| 5,262,490 A | 11/1993 | Kolb et al. |
| 5,285,002 A | 2/1994 | Grootaert |
| 5,378,782 A | 1/1995 | Grootaert |
| 5,442,097 A | 8/1995 | Obermeier et al. |
| 5,591,804 A | 1/1997 | Coggio et al. |
| 5,929,169 A | 7/1999 | Jing et al. |
| 6,613,941 B1 | 9/2003 | Felix et al. |
| 6,706,193 B1 | 3/2004 | Burkard et al. |
| 6,720,360 B1 | 4/2004 | Grootaert et al. |
| 6,794,550 B2 | 9/2004 | Hintzer et al. |
| 7,018,541 B2 | 3/2006 | Hintzer et al. |
| 7,569,631 B2 | 8/2009 | Tsuda et al. |
| 7,589,234 B2 | 9/2009 | Morita et al. |
| 7,671,112 B2 | 3/2010 | Hintzer et al. |
| 7,812,086 B2 | 10/2010 | Funaki et al. |
| 7,838,608 B2 | 11/2010 | Hintzer et al. |
| 2006/0293439 A1 | 12/2006 | Hetherington |
| 2007/0015865 A1 | 1/2007 | Hintzer et al. |
| 2007/0060699 A1 | 3/2007 | Tsuda et al. |
| 2007/0142513 A1 | 6/2007 | Tsuda et al. |

FOREIGN PATENT DOCUMENTS

| | | |
|---|---|---|
| CN | 101747862 A | 6/2010 |
| DE | 3802090 A1 | 8/1989 |
| EP | 0101930 A2 | 7/1983 |
| EP | 0 407 937 A1 | 7/1990 |
| EP | 0601725 A1 | 6/1994 |
| EP | 0 661 304 A1 | 12/1994 |
| EP | 0 76 9521 A1 | 4/1997 |
| EP | 2 110 251 A1 | 10/2009 |
| WO | WO 98/14517 A1 | 4/1998 |

OTHER PUBLICATIONS

Qu, Bungren, et al., "Comparison of Properties between the fluoroelastomers made in china and Italy", Chemical Abstract Service, Database accession No. 1994:657625, Abstract, XP-002668004.

Primary Examiner — Ramsey Zacharia
(74) Attorney, Agent, or Firm — C. Michael Geise

(57) ABSTRACT

Provided are methods of bonding a fluoroelastomer to a metal substrate; fluoropolymer compounds comprising a fluoroelastomer, a curing agent and a bonding promoter; and composite materials obtained by curing the compound. Further provided is the use of bonding promoters for increasing the bond strength between a fluoroelastomer and a metal substrate.

8 Claims, No Drawings

METHOD OF BONDING A FLUOROELASTOMER COMPOUND TO A METAL SUBSTRATE USING LOW MOLECULAR WEIGHT FUNCTIONAL HYDROCARDONS AS BONDING PROMOTER

FIELD

The present disclosure relates to a method of bonding a fluoropolymer composition to metal substrates using hydrocarbon-based bonding promoters. The present disclosure also relates to fluoropolymer compositions containing the hydrocarbon-based bonding promoters and to the use of hydrocarbon-based bonding promoters for improving the bond strength between a fluoropolymer and a metal. The present disclosure also relates to articles containing a fluoropolymer bonded to metal substrates by means of the bonding promoter.

BACKGROUND

The beneficial properties of fluoropolymers are well known in the art and include for example, high temperature resistance, high chemical resistance including for example high resistance to solvents, fuels and corrosive chemicals, and non-flammability. Because of these beneficial properties, fluoropolymers find wide application particularly where materials are exposed to high temperature and/or aggressive chemicals. Fluoroelastomers are fluoropolymers having elastic properties. They may be obtained upon curing (vulcanization) of amorphous fluoropolymers. Fluoroelastomers are widely used in the preparation of elastic articles where chemical resistance and heat resistance is required, for example as seals in automotive applications.

In applications where mechanical rigidity is required the fluoroelastomers are used as composite materials, i.e. they are bonded to materials providing the rigidity, such as metals. One of the requirements of such composite materials or articles is a firm and reliable bond between the fluoropolymer component and the metal component. Such bonds are generally created by curing the fluoroelastomer compound while being in contact with the other component of the composite material, e.g. a metal substrate. Typically, curing is carried out at temperatures between about 150 to about 200° C. in molds, typically under increased pressures. The compounds may additionally be subjected to a post cure treatment wherein the composite material is subjected to heating at about 200° C. to 250° C. for several hours, typically at ambient pressures.

SUMMARY

It has now been found that the bonding of curable fluoropolymers to metals can be improved such that a stronger bond between them can be generated when a hydrocarbon-based bonding promoter is used.

Therefore, in one aspect there is provided a method of bonding a fluoroelastomer to a metal substrate, said method comprises:
 i) providing a fluoroelastomer compound comprising
 a) a fluoroelastomer that is curable by a bisphenol and/or peroxide curing agent, and
 b) a curing agent with which the fluoroelastomer can be cured, and bringing the fluoroelastomer compound in contact with the metal substrate to form a common interface,
 ii) curing the fluoroelastomer compound in the presence of an effective amount of at least one bonding promoter, wherein the bonding promoter has a molecular weight of less than 5,000 g/mole and a boiling point of at least 150° C. at 760 Torr and is selected from saturated aliphatic or aromatic hydroxy ethers, esters of carbonates, carboxylic acids and phosphoric acids, and anhydrides of carbonates and carboxylic acids.

In another aspect there is provided a fluoropolymer compound comprising the fluoroelastomer, the curing agent and the bonding promoter.

In a further aspect there is provided the use of a molecule having a molecular weight of less than 5,000 g/mole and a boiling point of at least 150° C. at 760 Torr and being selected from saturated aliphatic or aromatic hydroxy ethers, esters of carbonates, carboxylic acids and phosphoric acids, and anhydrides of carbonates and carboxylic acids for increasing the bond strength between a fluoroelastomer and a metal substrate.

In yet another aspect there is provided a composite material comprising a fluoroelastomer component and a metal substrate, wherein the fluoroelestomer component is bonded to the metal and wherein the bond is the result of the curing reaction.

In another aspect there is provided an article comprising the composite material.

DETAILED DESCRIPTION

Before any embodiments of this disclosure are explained in detail, it is to be understood that the disclosure is not limited in its application to the details of arrangements of components set forth in the following description. The invention is capable of other embodiments and of being practiced or of being carried out in various ways. Also, it is to be understood that the phraseology and terminology used herein is for the purpose of description and should not be regarded as limiting.

Contrary to the use of "consisting", the use of "including," "containing", "comprising," or "having" and variations thereof is meant to encompass the items listed thereafter and equivalents thereof as well as additional items. The use of "consisting" is meant to exclude the presence of additional items.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The components of the compositions and methods of making or using them will be described in greater detail in the following.

Fluoroelastomer Compounds:

Fluorelastomers are typically provided in the form of "raw gums", which typically denotes the isolated and dried curable fluoroelastomers, or as "compounds". "Fluoroelastomer compounds" are solid compositions of the curable fluoroelastomer(s) and other ingredients, typically fillers and/or cure systems. The compounds are intimate and typically homogeneous mixtures of these ingredients, typically obtained after "compounding" them, i.e. mixing them, in particular dry mixing them, typically by milling and/or kneading. The fluoroelastomer compounds provided herein may contain at least one curable fluoroelastomer in an amount of more than 25%, more than 35% or more than 50% by weight, or even more than 75% by weight of curable fluoroelastomer based on the total weight of the composition (compound).

The fluoroelastomer compound is solid at room temperature (25° C.) and typically is still solid at a temperature of 110° C. The fluoroelastomer compound may be shaped. They may be of a substantially rectangular or a substantially cylindrically shape. The compound may be in the form of a sheet, for example a sheet having thickness of at least 100 µm, or at least 500 µm or at least or at least 1 mm, or at least 1 cm. The thickness of a sheet as understood herein is the smallest dimension of the sheet having as other dimension a length and a width. Other shapes may include, but are not limited to, "pellets" which are cylindrical shapes and may have at least one diameter of at least 500 µm, or at least 1 mm or at least 1 cm. The pellets also have a length being greater than the diameter.

The compound further contains at least one curing agent or cure system.

The compound may further contain one or more fillers as described below.

In a preferred embodiment, the compound may further contains at least one bonding promoter.

The above components will be further described below.

Bonding Promoter:

The bonding promoters provided herein are low molecular weight molecules having a molecular weight of less than 5,000 g/mole. The bonding promoter is hydrocarbon based and contains at least one, preferably two oxygen-containing functional groups, which may be identical or different. The functional oxygen-containing groups include ester, anhydrides and ether groups. Additionally, the bonding promoters may contain one or more hydroxy groups, i.e., they may be esters of hydroxy carboxylic acids, esters of polyols, or hydroxy ethers or combinations thereof.

The bonding promoters may be aromatic or aliphatic, linear, branched or cyclic. Aliphatic bonding promoters are preferably saturated, i.e., they do not contain carbon-carbon double or triple bonds. Aromatic bonding promoters may not bear substituents or may only bear saturated substituents.

The bonding promoters may be esters or anhydrides of carboxylic acids, carbonates or phosphoric acids. For example, the bonding promoters may be mono-, di- or tri-esters of carboxylic acids or phosphoric acids. Preferably, the promoters are alkyl, more preferably linear alkyl esters of carboxylic acids or phosphoric acids. The carboxylic acids may be aliphatic or aromatic mono-, di- or triacids. The esters may be mono-, di- or tri-esters.

Suitable esters of such acids include but are not limited to dialkyl adipates and dialkyl malonates, wherein the alkyl residues may be identical or different and may contain from 1 to 12 carbon atoms. Specific examples include, but are not limited to, dimethyl malonate, diethyl malonate, dibutyl malonate, dihexyl malonate, dioctyl malonate, dimethyl adipate, diethyl adipate, dihexyl adipate, dioctyl adipate etc.

Other examples include, but are not limited to, alkyl esters of fatty acids, wherein the alkyl residue typically has from 1 to 10 carbon atoms. Specific examples include alkyl stearates, alkyl palmitates, alkyl oleates etc.

Further examples include esters of carbonates, e.g., but not limited to, propylene carbonates.

The carboxylic acids may contain ether groups or hydroxy groups in case of, for example, hydroxy carboxylic acids. Suitable esters of hydroxy carboxylic acids include, but are not limited to, alkyl esters of citric acid or tartric acid.

Suitable examples of esters of aromatic carboxylic esters include, but are not limited to, alkyl esters of phthalic acids, salicylic acids, terephthalic acids, beonzoeic acids and the like. Specific examples include dialkyl phthalates like but not limited to dimethylphthalates diethylphthalates, dibutylphtalates, ethyl methyl phthalates, dioctylphthalates and combinations thereof.

Examples of esters of phosphoric acid include but are not limited to aryl or alkyl phosphates, for example trialkyl phosphates and alky aryl phosphates. Specific examples include but are not limited to trihexyl phosphates, diphenyloctyl phosphates, triethyl phosphates and combinations thereof.

Bonding promoters may also be hydroxy ethers, for example, mono-, di- or polyhydroxy ethers or polyoxy alcohols. Suitable examples include but are not limited to mono ether alcohols, e.g. triethylene glycol methyl ether, triethylene glycol ethyl ether and the like. Further examples include polyether alcohols like (poly)ethylene oxide glycols, (poly)propylene oxide glycols.

The bonding promoters may be solid or liquid at room temperature (25° C.) and ambient pressure (760 Torr) but have a boiling point of at least 150° C. (at 760 Torr) or at least 180° C. (at 760 Torr). Preferably, the bonding promoter is chosen according to the curing conditions to which the elastomer is going to be subjected. The boiling point should be high enough or the amount of bonding promoter should be high enough that it is still present in effective amounts at the interface between elastomer and metal where the bond is to be formed during the curing reaction.

Without wishing to be bound by theory, it is believed that the hydrocarbon-based bonding promoters provided herein are more effective in lowering the glass transition temperature of a fluoroelastomer compared to other molecules, which may lead to an increased flexibility of the fluoroelastomers during the curing reaction and to a more effective interfacial reaction with the metal substrate. Small amounts of bonding promoters may thus be sufficient to increase the bond strength. Therefore, suitable hydrocarbon-based bonding promoters may be selected from compounds that are capable of reducing the glass transition temperature of the fluoroelastomer to be bonded to the substrate by at least 4° C. when added to the elastomer in an amount of 5 phr (5% weight based on 100% weight of fluoroelastomer) as described in the method section and experimental section below.

It has been found that the addition of minor amounts of bonding promoters may be sufficient for increasing the bond strength. Typically, amounts of from about 10 ppm, or from about 50 ppm, or from about 100 ppm, or from about 250 ppm may be sufficient for increasing the bond strength (the amounts are based on the weight of fluoroelastomer). Depending on the type and amount of fillers to be used which may absorb the bonding promoters the amount of bonding promoters may be advantageously increased. While greater amounts of bonding promoters may not be detrimental to the bond strength, they may not be economical. Therefore, suitable amounts of bonding promoters may be in the range of from about 10 to about 10,000 ppm or from about 500 to 10,000 ppm or from about 20 to about 5,000 ppm or from about 90 to about 2,000 ppm of bonding promoter (based on the weight of fluoroelastomer).

Preferably, the bonding promoter is present in the compound itself, e.g. it has been compounded with the fluoroelastomer. However, it may instead, or additionally, be added to the compound, to the metal substrate or both prior or during the curing reaction.

Fluoroelastomers:

The fluoroelastomers are elastic before or become elastic after curing or their elasticity can be improved by curing. Typically, elastic polymers can be stretched upon application of a force but retain their original shape once that force is no longer applied.

The fluoroelastomers have a glass transition temperature (Tg) of less than 25° C. The glass transition temperature (Tg) of suitable fluoroelastomers may typically be from about −50° C. to about +20° C.

The fluoroelastomers are generally amorphous. This means the polymer typically has no melting point. The fluoropolymer typically will have Mooney viscosities (ML1+10 at 120° C.) of from about 5 to about 150 units, suitably from about 15 to about 100 units. The molecular weight distribution of the polymers may be mono-modal, bi-modal or multi-modal.

The fluoroelastomers contained in the fluoroelastomer compound are curable fluoropolymers, i.e., they can be cross-linked. Preferably, the fluoropolymers are peroxide curable or bisphenol curable or dual curable. Peroxide curable fluoropolymers are polymers that can be cross-linked by a reaction involving a peroxide curing agent or curing system as described below. Bisphenol curable fluoropolymers are polymers that can be cross-linked by a polyhydroxy-based curing agent or curing system as described below. A dual curable polymer can is curable by a peroxide and a bisphenol cure system as described below.

The fluoroelastomers contained in the composite material or article and bonded to the substrate are cured, for example they are "bisphenol-cured" or "peroxide cured". "Bisphenol-cured" fluoropolymers are the reaction product of a curing reaction of a bisphenol curable fluoroelastomer involving a bisphenol curing agent or system. A "peroxide-cured" fluoropolymer is the reaction product of a curing reaction of peroxide curable fluroelastamer involving a peroxide curing agent or system. They have been obtained by a curing reaction of the curable fluoropolymers contained in the fluoroelastomer compound.

The fluoroelastomers may have a partially or a fully fluorinated backbone. Polymers having a fully fluorinated backbone are referred to as "perfluorinated" polymers. Suitable fluoroelastomers typically have a backbone that is at least 30% by weight fluorinated, preferably at least 50% by weight fluorinated, more preferably at least 65% by weight fluorinated.

Examples of fluoroelastomers include copolymers of TFE (tetrafluoroethylene) and/or VDF (vinylidenfluoride). The copolymers may further contain one or more fluorinated monomers. The copolymers may in addition or instead to one or more fluorinated monomers contain monomers from one or more non-fluorinated monomers. Examples of fluorinated monomers include fluorinated $C_2$-$C_8$ olefins that may or may not have hydrogen and/or chlorine atoms such as chlorotrifluoroethylene (CTFE), 2-chloropentafluoropropene, dichlorodifluoroethylene, vinyl fluoride, fluorinated alkyl vinyl monomers such as hexafluoropropylene (HFP), fluorinated vinyl ethers, including perfluorinated vinyl ethers (collectively referred to as PVE) and fluorinated allyl ethers including perfluorinated allyl ethers (collectively referred to as PAE). Suitable non-fluorinated comonomers include vinyl chloride, vinylidene chloride and $C_2$-$C_8$ olefins such as ethylene (E) and propylene (P). In addition to the above cure site monomers may be present.

Bisphenol-Curable Fluoropolymers:

In a particular embodiment, the curable fluoropolymers are bisphenol curable, i.e. they can be cured by a bisphenol cure system. Bisphenol-curable fluoropolymers typically contain a partially fluorinated backbone. They include, for example, but are not limited to, copolymers of vinylidene fluoride (VDF) and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical like PVE and PAE. Specific examples of copolymers include for example copolymers having a combination of monomers as follows: VDF-HFP, VDF-TFE-HFP, VDF-TFE-PVE, VDF-TFE-PAE, VDF-TFE-PVE-PAE. Still further examples of suitable amorphous copolymers include copolymers having a combination of monomers as in CTFE-P.

Other examples of bisphenol-curable fluoropolymers include copolymers of TFE and one or more non-fluorinated or partially fluorinated comonomers. Specific examples include, for example, the combination of the following monomers: TFE-P, TFE-VDF, E-TFE-PVE, E-TFE-PAE, E-TFE-PVE-PAE and any of the aforementioned copolymers including cure-site monomers and/or further including units derived from a chlorine containing monomer such as CTFE.

Preferred bisphenol-curable fluoropolymers generally comprise from 20 to 85%, preferably 50 to 80% by moles of repeating units derived from VDF and/or TFE. They may or may not be copolymerized with one or more other fluorinated ethylenically unsaturated monomers as described above and/or one or more non fluorinated $C_2$-$C_8$ olefins, such as ethylene and propylene. The units derived from the fluorinated ethylenically unsaturated comonomer when present is generally between 5 and 45 mole %, preferably between 10 and 40 mole %. The amount of non-fluorinated comonomer when present is generally between 0 and 50 mole %, preferably between 1 and 30 mole %.

Peroxide-Curable Fluoropolymers:

Peroxide-curable fluoropolymers may have a partially or a fully fluorinated backbone. The peroxide curable fluoropolymers are curable by one or more peroxide curing agents or the radicals generated by the peroxide curing agents. Coagents may be used in combination with peroxide curing agent(s). The peroxide cure system (agents and co-agents) will be described in greater detail below.

Fluoropolymers that are curable by peroxide curing reaction may have the same comonomer composition and also in the same amounts as described above but may also have a comonomer composition of perfluorinated comonomers only, for example containing a combination of TFE and HFP, or TFE-HFP-PVE, or TFE-HFP-PAE, or TFE-HFP-PVE-PAE, or TFE-PVE, or TFE-PAE, or TFE-PVE-PAE. Peroxide curable fluoroelastomers also contain one or more group that is (are) capable of participating in a peroxide curing reaction. Such groups react with the peroxide agent or a radical generated by the curing agent and form cross-links. The polymer may then form a three-dimensional network and becomes elastic or becomes more elastic (the materials can be stretched more and still retain their original shape after the stretching force has been released). Typical groups capable of participating in a peroxide curing reaction include halogens (other than fluorine, and preferably chlorine, bromine and iodine, most preferably bromine and iodine) and nitrile groups. The groups capable of participating in a peroxide curing reaction may by distributed along the polymer chain and/or may be contained in the end groups of the fluoropolymer. Typically, the amount of these groups (in particular bromine and/or iodine) contained in the fluoropolymer is between 0.001 and 5%, preferably between 0.01 and 2.5%, by weight with respect to the total weight of the fluoropolymer.

To introduce halogens capable of participating in the peroxide curing reaction along the chain, cure-site monomers may be used in the polymerisation of the fluoropolymer (see for instance EP 2 110 251 A1, U.S. Pat. No. 4,831,085, and U.S. Pat. No. 4,214,060). Such cure-site comonomers contain the peroxide-curable group or a plurality thereof or the respective precursors. Cure-site monomers include, for example, but are not limited to:

(a) bromo- or iodo-(per)fluoroalkyl-(per)fluorovinylethers having the general formula:

$$ZRf-O-(CF_2)_n-CX=CX_2$$

wherein each X may be the same or different and represents H or F, Z is Br or I, Rf is a (per)fluoroalkylene containing from 1 to 12 carbon atoms, optionally containing chlorine and/or ether oxygen atoms and n represents 1, 2 or 0.

Suitable examples include $BrCF_2-O-CF=CF_2$, $BrCF_2CF_2-O-CF=CF_2$, $BrCF_2CF_2CF_2-O-CF=CF_2$, $CF_3CFBrCF_2-O-CF=CF_2$;

(b) bromo- or iodo perfluoroolefins such as those having the formula:

$$Z'-(Rf')_r-CX=CX_2$$

wherein each X independently represents H or F, Z' is Br or I, Rf' is a perfluoroalkylene containing from 1 to 12 carbon atoms, optionally containing chlorine atoms and r is 0 or 1; and (c) non-fluorinated bromo and iodo-olefins such as vinyl bromide, 4-bromo-1-butene and 4-iodo-1-butene.

Specific examples include: bromotrifluoroethylene, 4-bromo-perfluorobutene-1, or bromofluoroolefins such as 1-bromo-2,2-difluoroethylene and 4-bromo-3,3,4,4-tetrafluorobutene-1.

Instead of or in addition to cure sites distributed along the polymer chain, the cure sites may be located in a terminal position of the polymer, for example as the result of using a suitable reaction initiator or a suitable chain transfer agent in the reaction medium during the polymer preparation, as described, for example, in EP 101 930 A1.

Examples of suitable chain transfer agents include those having the formula $RfP_x$, wherein P is Br or I, Rf is a x-valent (per)fluoroalkyl radical having from 1 to 12 carbon atoms, optionally containing chlorine atoms, while x is 1 or 2. Specific examples include $CF_2Br_2$, $Br(CF_2)_2Br$, $Br(CF_2)_4Br$, $CF_2ClBr$, $CF_3CFBrCF_2Br$, $I(CF_2)_2I$, $I(CF_2)_4I$ (Further examples of suitable chain transfer agents are disclosed, for example, in U.S. Pat. No. 4,000,356, EP 407 937 A1 and U.S. Pat. No. 4,243,770. Further examples of chain transfer agents include non fluorinated chain transfer agents such as di-iodomethane or di-bromomethane.

Examples of useful initiators include those of the general formula $X(CF_2)_nSO_2Na$ with n=1 to 10 (where X is Br or I). Still further, the initiation and/or polymerization may be conducted in the presence of a halide salt such as a metal or ammonium halide including for example potassium chloride, sodium chloride, potassium bromide, ammonium bromide or chloride and potassium or sodium iodide to introduce a halide in a terminal position of the fluoropolymer.

Additionally, cure-site components may derive from nitrile containing monomers used in the polymerisation of the fluoropolymer. Examples of nitrile containing monomers include but are not limited to:

$$CF_2=CF-CF_2-O-Rf-CN;$$

$$CF_2=CFO(CF_2)_rCN; CF_2=CFO[CF_2CF(CF_3)O]_p(CF_2)_vOCF(CF_3)CN;$$

$$CF_2=CF[OCF_2CF(CF_3)]_kO(CF_2)_uCN$$

wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include perfluoro (8-cyano-5-methyl-3,6-dioxa-1-octene), $CF_2=CFO(CF_2)_5CN$, and $CF_2=CFO(CF_2)_3OCF(CF_3)CN$.

Dual Cure Fluoropolymers:

The curable fluoropolymers may also be dual curable, which means they can be cured by a combination of a bisphenol cure system and a peroxide cure system as described above.

Preparation of Curable Fluoropolymers:

The curable fluoropolymers can be made in accordance with any of the known polymerization methods for making fluoropolymers. Such methods include without limitation, aqueous emulsion polymerization, suspension polymerization and polymerization in an organic solvent. The curable elastomers are separated from the reaction medium and subjected to drying to create a dry solid also referred to as 'raw gum'. The raw gum may be further processed to give a fluoropolymer compound as described herein above and below. The fluoroelastomer raw gum or compound typically is dry. Typically the fluoroelastomer raw gum or compound has a water content of less than 1% by weight based on the total composition.

Generally, the fluoroelastomers are made by aqueous emulsion polymerisation. The aqueous emulsion polymerization can be carried out continuously or under steady-state conditions. The polymerization may be carried out in the presence of a microemulsion using an aqueous emulsion of perfluoro ethers and optionally fluorinated emulsifiers. The polymerization may also be carried without a microemulsion but with emulsifiers or without emulsifiers. Typically, the monomers, water, emulsifiers, buffers and catalysts are fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent emulsion or suspension by vaporization at reduced pressure. The polymer is recovered from the emulsion by coagulation. (In case of suspension polymerization the polymer settles from the aqueous phase after stirring is discontinued and coagulation may not be necessary to separate the polymer). The polymerization is generally conducted in the presence of a free radical initiator system, such as ammonium persulfate or tertbutyl peroxide. The polymerization reaction may further include other components such as chain transfer agents and complexing agents. The chain transfer agents preferably are dialkyl ethers (or in case of introducing functional groups, like cure sites, functionalized chain transfer agents may as described above may be used instead or in addition to the afore-mentioned chain transfer agents). Typical examples of dialkylether chain transfer agents include but are not limited to dimethyl ether, diethyl ether, methyl tert-butyl ether, methyl ethyl ether, and combinations thereof. The polymerization is generally carried out at a temperature between 10° C. and 100° C., and preferably between 30° C. and 80° C. The polymerization pressure is usually between 0.3 MPa and 30 MPa, and preferably between 1 MPa and 10 MPa.

When conducting emulsion polymerization, perfluorinated or partially fluorinated emulsifiers may be used, in addition to emulsifier-free polymerizations. Generally these fluorinated emulsifiers comprise from about 0.02% to about 3% by weight with respect to the polymer to be produced. Polymer particles produced with a fluorinated emulsifier typically have an average diameter, as determined by dynamic light scattering, between about 10 nm to about 400 nm, and preferably between about 50 nm and about 300 nm.

Such fluorinated and partially fluorinated emulsifiers include those commonly used in emulsion polymerization of fluorine containing monomers. Examples of such emulsifiers include fluoroalkyl, preferably perfluoroalkyl, carboxylic acids and salts thereof having 6-20 carbon atoms, preferably 6-12 carbon atoms, such as ammonium perfluorooctanoate (APFO) and ammonium perfluorononanoate. (See, e.g. U.S. Pat. No. 2,559,752).

Additional examples of such emulsifiers also include perfluorinated and partially fluorinated polyether carboxylic acids, such as emulsifiers having the formula Rf-O-L-COOX wherein L represents a partially or fully fluorinated alkylene group or an aliphatic hydrocarbon group, Rf represents a partially or fully fluorinated aliphatic group or a partially or fully fluorinated aliphatic group interrupted with one or more oxygen atoms, X represents a cation (See, e.g. U.S. Pat. Publ. No. 2007/0015864, 2007/0015865, 2006/0199898, 2007/0142541, 2006/0223924, 2007/0060699, 2007/0142513 and 2006/0281946.

The fluorinated emulsifiers can be removed or recycled from the fluoropolymer emulsions or dispersion as described, e.g., in U.S. Pat. Nos. 5,442,097, 6,613,941, 6,794,550, 6,706,193 and 7,018,541.

The amount of fluoropolymer solids in the dispersion may be upconcentrated as needed or desired to an amount between 30 and 70% by weight. Any of the known upconcentration techniques may be used including ultrafiltration and thermal upconcentration.

In some embodiments, a water soluble initiator can be used to start the polymerization process. Salts of peroxy sulfuric acid, such as ammonium persulfate, are typically applied either alone or sometimes in the presence of a reducing agent, such as bisulfites or sulfinates (disclosed in commonly-owned U.S. Pat. Nos. 5,285,002 and 5,378,782) or the sodium salt of hydroxy methane sulfuric acid (sold under the trade name RONGALIT, BASF Chemical Company, New Jersey, USA). Most of these initiators and the emulsifiers have an optimum pH-range where they show most efficiency. For this reason, sometimes buffers are used in some embodiments. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium.

The fluoropolymer may be isolated and separated from the aqueous phase by coagulation. To coagulate the obtained fluoropolymer emulsion or dispersion any coagulant which is commonly used for coagulation of a fluoropolymer emulsion or dispersion may be used, and it may, for example, be a water soluble salt such as calcium chloride, magnesium chloride, aluminum sulfate, aluminum chloride or aluminum nitrate, and/or an acid such as nitric acid, hydrochloric acid or sulfuric acid, or a base such as ammonia or alkali metal hydroxides or a water soluble organic liquid such as an alcohol or acetone. The amount of the coagulant to be added is preferably from 0.001 to 20 parts by mass, particularly preferably from 0.01 to 10 parts by mass per 100 parts by mass of the fluorinated elastomer emulsion or dispersion. Further, the fluorinated elastomer emulsion or dispersion can be coagulated by a mechanical shear such as high speed stirrer. The fluorinated elastomer emulsion or dispersion may be frozen for coagulation. The coagulated fluorinated elastomer is preferably collected by filtration and washed with washing water. The washing water may, for example, be ion exchanged water, pure water or ultrapure water. The amount of the washing water may be from 1 to 5 times by mass to the fluorinated elastomer, whereby the amount of the emulsifier attached to the fluorinated elastomer can be sufficiently reduced by one washing. The resulting raw gum is then subjected to drying. Standard drying procedures may be used. Preferably the raw gum may be dried at 60° C. or at a temperature between 60 and 150° C. in a forced air oven for 24 hours. Drying may also be carried out in an extruder at temperatures between 80° C. and 200° C. and a retention time above 30 seconds and below 5 minutes. The residual moisture of the dried raw gum is typically less than 1.0 wt %, preferably less than 0.5 wt. %. Residual moisture may be greater than 0.05 wt %.

The raw gum may be used in the process of bonding to the metal, where the curing agent or system and the bonding promoter may then be added at latest during the curing step.

Preparation of Fluoroelastomer Compounds:

Preferably, the raw gum is compounded, i.e. it is subjected to a compounding process where curing agents or systems and fillers are added to the raw gum and combined with it by (dry) mixing them into the gum to make a fluoroelastomer compound. Typical mixing devices for rubber mixing may be used. The typical compounding process is to use a multiple roll mill, like a two-roll mill, or internal mixers (e.g., Banbury mixers). For best results, the temperature of the mixture should not rise above about 120° C. during compounding but may well rise above 100° C. During mixing the components are mixed and dispersed uniformly. The resulting compounds typically have the shape of sheets or pellets as described above. Typical ingredients of the compounds include the curing agents or systems described above or below, depending on the type of curable polymer, and one or more fillers. Preferred fillers include carbon particles, including but not limited to carbon blacks. Carbon black fillers may be typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks, acetylene black, ketchen black and the like. When used, 1 to 100 parts filler per hundred parts fluoropolymer (phr) of large size particle black is generally sufficient.

Fluoropolymer fillers may also be present in the compositions. Generally, from 1 to 100 phr of fluoropolymer filler is used. The fluoropolymer filler can be finely divided and easily dispersed as a solid at the highest temperature used in fabrication and curing of the inventive composition. Fluoropolymer fillers are crystalline and will have a crystalline melting temperature above the processing temperature(s) of the curable composition(s), i.e. a melting temperature typically greater than 230° C. or greater than 250° C. A preferred way to incorporate fluoropolymer filler is by blending latices. This procedure, including various kinds of fluoropolymer filler, is described in commonly-owned U.S. Pat. No. 6,720,360.

Conventional adjuvants may also be incorporated into the compound of the present invention to enhance the properties of the compound.

Other additives include stabilizers, lubricants, and processing aids typically utilized in fluoropolymer compounding, provided they have adequate stability for the intended service conditions.

Further ingredients may include the bonding promoter as described above, which in a preferred embodiment is present in the compound.

Other ingredients may include acid acceptors as are commonly used in the preparation of fluoroelastomer layers or laminates. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0.5 and 5 parts per 100 parts of fluoropolymer.

The fluoroelastomers and fluoroelastomer compounds are also commercially available for example from DuPont under the trade designation VITON, from 3M under the trade designation DYNEON elastomers, or from Daikin under the trade designation DAI-EL.

Peroxide Curing Agents and Cure Systems:

The peroxide curing agents typically comprise an organic peroxide. Suitable organic peroxides are those which generate free radicals at the temperatures used in the curing (typically, temperatures of about 120° C. to about 200° C., or from about 140° C. to about 180° C.). Dialkyl peroxides or bis(dialkyl peroxides) which decompose at a temperature above 50° C. are especially preferred. In many cases it is preferred to use a di-tertiary-butyl peroxide having a tertiary carbon atom attached to the peroxy oxygen. Among the most useful peroxides of this type are 2,5-dimethyl-2,5-di(tertiary-butylperoxy)hexyne-3 and 2,5-dimethyl-2,5-di(tertiary-butylperoxy)hexane. Other peroxides include, for example, dicumyl peroxide, dibenzoyl peroxide, tertiary-butyl perbenzoate, alpha,alpha'-bis(t-butylperoxy-diisopropylbenzene), and di[1,3-dimethyl-3-(t-butylperoxy)-butyl] carbonate. Generally, about 1 to 5 parts of peroxide curing agent per 100 parts of fluoropolymer are used. Peroxide curing agents are commercially available, for example, under the trade designations Perkadox, Luperco and Trigonox.

The peroxide curing agents may be used in combination with one or more coagents. The coagent may increase the curing speed and/or lower the curing temperature and/or improving the curing result. Typically, the coagent is composed of a polyunsaturated compound, such as bisolefins, triallyl, divinyl, trivinly and divinyl compounds. The coagents may be added in an amount of between about 0.1 and about 10 parts per hundred parts fluoropolymer, preferably between about 2 and about 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl inalonamide; trivinyl isocyanurate; 2,4,6-trivinyl methyltrisiloxane; N,N'-m-phenylenebismaleimide; diallylphthalate and tri(5-norbornene-2-methylene)cyanurate. Particularly useful is triallyl isocyanurate. Other useful coagents include the bis-olefins disclosed in EP 0661304 A1 and EP 0769521 A1. The combination peroxide curing agent and coagent is referred to herein above and below as peroxide cure system.

Bisphenol Curing Agents and Cure Systems:

The bisphenol cure system typically comprises an aromatic polyhydroxy based curing agent. In addition to the aromatic polyhydroxy curing agent, a polyhydroxy curing system generally also comprises one or more organo-onium accelerators. Organo-onium compounds typically contain at least one heteroatom, i.e., a non-carbon atom such as N, P, S, O, bonded to organic or inorganic moieties and include for example ammonium salts, phosphonium salts and iminium salts. One class of useful quaternary organo-onium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.). Many of the organo-onium compounds are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo[5,4,0]-7-undecenium chloride
benzyl tris(dimethylamino)phosphonium chloride
benzyl(diethylamino)diphenylphosphonium chloride Another class of useful organo-onium compounds include those having one or more pendent fluorinated alkyl groups. Generally, the most useful fluorinated onium compounds are disclosed by Coggio et al. in U.S. Pat. No. 5,591,804.

Polyhydroxy compounds that may be used may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). Representative examples include aromatic polyhydroxy compounds, preferably any one of the following: di-, tri-, and tetrahydroxybenzenes, naphthalenes, and anthracenes, and bisphenols of the following formula:

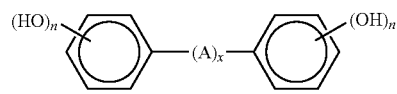

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g., —COR where R is H or a C1 to C8 alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds may also be used.

A particular useful example of an aromatic polyphenol of the above formula comprises 4,4'-hexafluoroisopropylidenyl bisphenol, known more commonly as bisphenol AF. Further useful examples include 4,4'-dihydroxydiphenyl sulfone (also known as Bisphenol S) and 4,4'-isopropylidenyl bisphenol (also known as bisphenol A).

Preparation of Composite Materials:

Bonding between a fluoroelastomer component and a metal substrate can be achieved by contacting the fluoroelastomer compound and the substrate such that a common interface is formed. The compositions are then subjected to conditions at which the fluoroelastomer cures. It may be sufficient to cure locally, i.e. to cure only the parts of the fluoroelastomer compound that forms the common interface with the substrate. Curing is carried out in the presence of the curing agent and the bonding promoter, although further ingredients, such as for example a curing coagents and fillers may also be present during the curing. Using the bonding promoter described herein, the bond strength of the resulting bond between fluoroelastomer component and metal substrate of a fluoroelastomer-metal composite material may be increased. This is noticeable by an increased amount of rubber tear (% RT).

For bonding the fluoroelastomer compound is typically provided in the form of a layer, a sheet, a film or a laminate or as pellets. The fluoropolymer is brought into contact with the substrate. Typically, this will be done in a mold. The compositions may then be bonded together in the presence of the curing agent and bonding promoter using effective heat and pressure for an effective period of time to create a strong bond, however, a heat treatment may be sufficient. Preferably the conditions are chosen to allow for the curing reaction(s) to proceed.

Uncured elastomers can be molded using any one of a number of techniques. In some embodiments, uncured elastomers are compression molded by placing a quantity of cold uncured elastomer mixture into a heated mold cavity and subsequently closing the mold using adequate pressure to shape the article. After retaining the elastomer at sufficient temperature during sufficient time to allow vulcanization to proceed, it can then be demolded.

In some embodiments, uncured elastomers are injection molded by first heating and masticating elastomer mixtures in an extruder screw and then collecting the elastomer mixtures in a heated chamber from which they are injected into a hollow mold cavity by means of a hydraulic piston. After vulcanization the article can then be demolded.

Advantages of injection molding process include short molding cycles, little or no preform preparation, little or no flash to remove, and low scrap rate. If the compound viscosity is low, the cylinder, barrel and screw temperature can be low and there is less risk to scorch during the flow into the mold. Also low compound viscosity can improve fill or injection time. Typical mold temperature is 170° C. to 220° C. and heating or molding time is 20 seconds to 3 minutes depending on parts thickness.

In some embodiments, the elastomer mixtures are transfer molded. Transfer molding is similar to injection molding with the difference being that the elastomer mixture is not preheated and masticated by an extruder screw but introduced as a cold mass in the heated injection chamber.

Typical curing conditions for fluoroelastomer mixtures are elevated temperatures e.g. about 160° C. to about 210° C., pressures above 7 bar and maintaining these conditions for 30 seconds, in fast injection molding processes to 5 minutes or longer for larger compression molded articles.

Pressing of the compounded mixture (i.e., press cure) is typically conducted at a temperature of about 140 to 220° C., preferably about 150 to 190° C., for a period of about 1 minute to about 15 hours, usually for about 1 to 15 minutes. A pressure of about 700 to 20,000 kPa, preferably about 3400 to about 6800 kPa, is typically used in molding the composition. The molds first may be coated with a release agent and prebaked.

The molded vulcanizate can be post cured in an oven at a temperature of about 150-320° C., preferably at a temperature of about 160-300° C., for a period of about 1-24 hours or more, depending on the type of polymer used and the cross-sectional thickness of the sample. For thick sections, the temperature during the post cure is usually raised gradually from the lower limit of the range to the desired maximum temperature. The maximum temperature used is typically about 230° C., and is held at this value for about 1 hour or more.

The fluoroelastomers can be bonded to substrates, which preferably are metal substrates. Metal substrates are preferably metals containing iron or iron alloys like steel. Other metal substrates include aluminium and tin including their alloys. The metal substrates may be subjected to a pre-treatment to increase the surface roughness of the metal substrate, but this may not be required.

The composites may be used as articles or as components of articles providing a sealing function, in particular articles that act as seals and contain a surface exposed to or to be exposed to a liquid hydrocarbon and/or to hydrocarbon fumes. Liquid refers to ambient conditions (25° C., 1 bar). Examples of such hydrocarbons include hydrocarbon fuels, like, for example, liquid hydrocarbons or hydrocarbon mixtures, like kerosene, petrol, diesel and the like. Other examples include liquefied hydrocarbons, like liquefied propene, butane or liquefied natural gas, liquefied synthetic natural gas and the like.

Articles include O-rings, valves, bearings and storage containers for hydrocarbons, in particular fuels. The articles may be used, for example in motor vehicles having a fuel combustion engine, such as motorcrafts, aircrafts and water crafts, or in oil & gas processing, storing and transportation. The articles may also be used in medical applications, for examples as seals in a medical apparatus or device.

Specific examples of such articles include but are not limited to shaft seals, in particular cam shaft seals, valve stem seals, air intake manifolds, turbo charger housing sealings and couplings, oil cooler sealing and coupling. Articles for use in oil & gas processing or storing include, for example, casing seals, subsea safety valve packs, packers, christmas three seals, wire line parts, gas check valve seals, heat exchanger gaskets, bearings, valve stems, riser pipes connections and blow out preventors.

The composite materials may also be used in seals exposed to acids; bases and corrosive and/or toxic gases like $H_2S$, chlorine, ammonia, and nitrogen, argon, carbon dioxide, carbon mono oxide.

The following examples and list of embodiments are provided to illustrate certain embodiments but are not meant to be limited in any way. Prior to that some test methods used to characterize materials and their properties will be described.

LIST OF EMBODIMENTS

1. A method of bonding a fluoroelastomer to a metal substrate, said method comprises:

i) providing a fluoroelastomer compound comprising a) one or more fluoroelastomer that is curable by a bisphenol and/or a peroxide curing agent, and b) one or more curing agent by which the fluoroelastomer can be cured and bringing the fluoroelastomer compound in contact with the metal substrate to form a common interface, ii) curing the fluoroelastomer compound to form a bond with the metal substrate in the presence of an effective amount of at least one bonding promoter, wherein the bonding promoter has a molecular weight of less than 5,000 g/mole and a boiling point of at least 150° C. at 760 Torr and is selected from saturated aliphatic or aromatic hydroxy ethers, esters of carbonates, carboxylic acids and phosphoric acids, and anhydrides of carbonates and carboxylic acids.

2. The method of embodiments 1 wherein the bonding promoter is selected from aliphatic and aromatic alkyl esters of carboxylic acids, carbonates and phosphoric acids.

3. The method according to embodiments 1 or 2 wherein the bonding promoter is selected from mono-, di- or trialkyl esters of aliphatic or aromatic carboxylic acids or phosphoric acids.

4. The method according to any one of embodiments 1 or 2 wherein the bonding promoter is a hydroxy ether.

5. The method according to any one of the preceding embodiments wherein the bonding promoter is capable of reducing the glass transition temperature of the fluoroelastomer by at least 4° C. when present in the fluoroelastomer at an amount of 5 phr based on the amount of fluoroelastomer (i.e. 5% weight based on 100% weight of fluoroelastomer).

6. The method according to any one of the preceding embodiments, wherein the bonding promoter is present in the fluoroelastomer compound.

7. The method according to any one of the preceding embodiments, wherein the bonding promoter is present in an amount of at least about 10 ppm based on the weight of fluoroelastomer.

8. The method according to any one of the preceding embodiments, wherein the bonding promoter is present in an amount of at least about 250 ppm based on the weight of fluoroelastomer.

9. The method according to any one of the preceding embodiments, wherein the bonding promoter is present in an amount of from about 500 ppm to about 10,000 ppm based on the weight of fluoroelastomer.

10. The method according to any one of the preceding embodiments wherein the fluoroelastomer has a Mooney viscosity (ML1+10 at 120° C.) of 5 to 150.

11. The method according to any one of the preceding embodiments wherein the fluoroelastomer compound has a water content of less than 1% by weight based on the total weight of the composition.

12. A fluoropolymer compound comprising the curable fluoroelastomer, the curing agent by which the fluoroelastomer can be cured and the bonding promoter according to any one of embodiment 1 to 11.

13. The fluoropolymer compound of embodiment 11. having a water content of less than 1% by weight.

14. The fluoropolymer compound of embodiments 12 or 13 being shaped into a sheet or a pellet.

15. The fluoropolymer compound of any one of embodiments 12 to 14 wherein the bonding promoter is selected from aliphatic and aromatic alkyl esters of a carboxylic acid or carbonate.

16. The fluoropolymer compound of any one of embodiments 12 to 14 wherein the bonding promoter is selected from aliphatic and aromatic mono-esters, di-esters and tri-esters of a phosphoric acid.

17. The fluoropolymer compound according to any one of embodiments 12 to 14 wherein the bonding promoter is a hydroxy ether.

18. The fluoropolymer compound of any one of embodiments 12 to 17 wherein the bonding promoter is capable of reducing the glass transition temperature of the fluoroelastomer by at least 4° C. when present in the fluoroelastomer at an amount of 5 phr (5% weight based on 100% weight of fluoroelastomer).

19. The fluoropolymer compound according to any one of embodiments 12 to 18 further comprising a filler containing carbon particles, like a carbon black.

20. The fluoropolymer compound according to any one of embodiments 10 to 19 comprising at least 10 ppm, at least 100 ppm or at least 250 ppm of the bonding promoter.

21. The fluoropolymer compound according to any one of embodiments 12 to 20 comprising from about 50 ppm to about 10,000 ppm or from 70 ppm to about 7,000 ppm of the bonding promoter based on the weight of fluoroelastomer.

22. The fluoropolymer compound according to any one of embodiments 12 to 21 wherein the fluorolelastomer is bisphenol curable and the compound contains a bisphenol cure system.

23. The fluoropolymer compound according to any one of embodiments 12 to 21 wherein the fluorolelastomer is peroxide curable and the compound contains a peroxide cure system.

24. The fluoropolymer compound according to any one of embodiments 12 to 23 wherein the fluoroelastomer is dual curable and contains a peroxide and a bisphenol cure system.

25. Use of a bonding promoter having a molecular weight of less than 5,000 g/mole and a boiling point of at least 150° C. at 760 Torr and selected from saturated aliphatic or aromatic hydroxy ethers, esters of carbonates, carboxylic acids and phosphoric acids, and anhydrides of carbonates and carboxylic acids for increasing the bond strength between a fluoroelastomer and a metal.

26. The use of embodiment 25 wherein the bonding promoter is as defined in any one of embodiments 2 to 5.

27. The use of any one of embodiments 25 and 26 wherein the bonding promoter is used in an amount of at least 10 ppm, at least 100 ppm or at least 250 ppm of the bonding promoter based on the weight of fluoroelastomer.

28. The use of any one of embodiments 25 to 27 wherein the bonding promoter is used from about 50 ppm to about 10,000 ppm or from 70 ppm to about 7,000 ppm of bonding promoter based on the weight of fluoroelastomer 29. Method of increasing the bond strength between a fluoroelastomer component and a metal substrate comprising adding to the fluoroelastomer component a bonding promoter according to any one of embodiments 2 to 5.

30. The method of embodiment 29 wherein the bonding promoter is added in amounts as described in embodiments 27 or 28.

31. A composite material comprising a fluoroelastomer bonded to a metal substrate wherein the bond is obtained by the curing a fluoroelastomer compound contacting the metal substrate, wherein the fluoroelastomer compound is a fluoropolymer compound as defined in any one of embodiments 12 to 24.

32. An article comprising the composite material of embodiment 31.

33. The article of embodiment 32 being a seal or a component of a seal having a surface exposed to a hydrocarbon fuel or a hydrocarbon fuel fumes.

34. A method of bonding a fluoroelastomer to a metal substrate, said method comprises:

i) providing a fluoroelastomer compound comprising a) a fluoroelastomer that is curable by a bisphenol and/or peroxide curing agent, and b) a curing agent with which the fluoroelastomer can be cured, and bringing the fluoroelastomer compound in contact with the metal substrate to form a common interface, ii) curing the fluoroelastomer compound in the presence of an effective amount of at least one bonding promoter, wherein the bonding promoter has a molecular weight of less than 5,000 g/mole and a boiling point of at least 150° C. at 760 Torr and is selected from saturated aliphatic or aromatic hydroxy ethers, esters of carbonates, carboxylic acids and phosphoric acids, and anhydrides of carbonates and carboxylic acids.

35. The method of embodiment 34 wherein the bonding promoter is selected from an aliphatic and aromatic mono-ester, di-esters and tri-esters of a carboxylic acid and a combination thereof.

36. The method according to embodiments 34 or 35 wherein the bonding promoter is selected from mono-, di- or tri-alkyl esters of an aliphatic or aromatic carboxylic acid and a combination thereof.

37. The method according to any one of the preceding embodiments wherein the bonding promoter is capable of reducing the glass transition temperature of the fluoroelastomer by at least 4° C. when present in the fluoroelastomer at an amount of 5% by weight based on 100% weight of fluoroelastomer.

38. The method according to any one of the preceding embodiments, wherein the bonding promoter is present in the fluoroelastomer compound.

39. The method according to any one of the preceding embodiments, wherein the bonding promoter is present in an amount of at least about 10 ppm based on the weight of the fluoroelastomer.

40. The method according to any one of the preceding embodiments, wherein the bonding promoter is present in an amount of at least about 250 ppm based on the weight of the fluoroelastomer.

41. The method according to any one of the preceding embodiments, wherein the bonding promoter is present in an amount of from about 500 ppm to about 10,000 ppm based on the weight of the fluoroelastomer.

42. The method according to any one of the preceding embodiments wherein the fluoroelastomer has a Mooney viscosity (ML1+10 at 120° C.) of 5 to 150.

43. A fluoropolymer compound comprising the fluoroelastomer, the curing agent and the bonding promoter as defined in any one of embodiments 34 to 42.

44. Use of a molecule having a molecular weight of less than 5,000 g/mole and a boiling point of at least 150° C. at 760 Torr and being selected from saturated aliphatic or aromatic hydroxy ethers, esters of carbonates, carboxylic acids and phosphoric acids, and anhydrides of carbonates and carboxylic acids for increasing the bond strength between a fluoroelastomer and a metal substrate.

45. A composite material comprising a fluoroelastomer component and a metal substrate, wherein the fluoroelestomer component is bonded to the metal and wherein the bond is the result of a curing reaction according to any one of embodiments 34 to 42.

46. An article comprising the composite material of embodiment 45.

47. The article of embodiment 46 being a seal.

Materials

DG 2941: bisphenol curable elastomer, containing repeating units derived from vinylidenefluoride and hexafluoropropene having a fluorine content of 66% and a Mooney viscosity (1+10) 120° C. of 40. Available from Dyneon GmbH, Burgkirchen, Germany.

E-21051: bisphenol curable fluoroelastomer like DG2941 containing a bisphenol cure system, available from Dyneon GmbH, Burgkirchen, Germany.

TREMIN 2378-600 EST: epoxy-treated calcium silicate filler available from Quarzwerke Frechen, Germany.

BLANC FIX F: precipitated barium sulfate filler from Sachtleben Chemie, GmbH, Duisburg, Germany.

COLORTHERM RED 520: Iron oxide powder (pigment) from Harold Scholz & Co. GmbH, Recklinghausen. Germany.

MT N-990: carbon black, filler, from Cancarb Ltd, Alberta, Canada

ELASTOMAG 170: Magnesium oxide, from Rohm & Haas Company,

RHENOFIT CF: Calcium hydroxide from Rhein Chemie Rheinau GmbH, Mannheim, Germany CARNAUBA WAX: natural plant wax from Paramelt Veendam BV, Veendam, Netherlands.

ARMEEN 18D: Octadecylamine from AKZO Nobel, Amsterdam, Netherlands.

Methods

The glass transition temperature can be determined by differential scanning calorimetry according to ASTM D 4591 at temperatures from −50° C. to 0° C. with a heating rate of 10 K/min. Midpoint of glass transition is taken as glass transition temperature.

Mooney viscosity (ML1+10 at 120° C.) can be determined according to ASTM D 1646.

Water content of raw gums and compounds can be determined gravimetrically using a thermobalance. On the balance a clean and dry aluminum plate is inserted. The balance is then tared to zero. About 10 grams of raw gum is distributed onto the plate. The balance is heated up to 160° C. and held at this temperature for 20 minutes. The difference in weight before and after heat treatment represents the water content of the raw gum.

EXAMPLES

Reference Example 1

Capability to Reduce the Glass Transition Temperature

The glass transition temperature of the fluoroelastomer was determined. The elastomer DG2941 was used as reference.

The test compound was added in an amount of 5% weight to the fluoroelastomer (raw gum) and compounded by using a Dr. Collin roll, Type 150×400 E having a speed of 23.8 rpm and a friction of 60%. The glass transition temperature (Tg)

was measured again and the reduction in Tg was determined. The glass transition temperature reduction was averaged from 3 compounds.

The results for various materials are shown in table 1. Dodecane and tetramethylene sulfone showed no or only a small reduction in glass transition temperature when added to the fluoroelastomer. The compounds according to the claims show a significant reduction in Tg by at least 4° C.

TABLE 1

Effect on Tg of the addition of various low molecular weight compounds.

| Low molecular weight compound added to fluoroelastomer | Tg of fluoroelastomer |
|---|---|
| — | −21° C. |
| Diethylmalonate | −31° C. |
| Triethyleneglycol mono methyl ether | −30° C. |
| Tetramethylenesulfone | −24° C. |
| Propylencarbonate | −30° C. |
| Trieethylphosphate | −28° C. |
| Dodecane | −21° C. |

Reference Example 2 and Examples 1a-1d and 2a-2d

Fluoroelastomer compounds were prepared from the ingredients indicated in table 2 by combining diethylmalonate (DEM) or triethylene glycol mono methyl ether (MTG) with the rubber on a two roll mill (150×130 mm two roll mill, 7.5 kW DC engine from Agila N.V., Ieper, Belgium) to make compounds ("concentrates") of DEM or MTG in the raw gum at a concentration of 1% by weight of DEM or MTG respectively. The concentrates were then added to raw gum in amounts to give final concentration of DEM/MTG as indicated in table 2 and compounded on a 350×750 two mill roll mill with a 37 kW from Agila B.V., Ieper. Belgium.

TABLE 2

Compound formulation:

| Example | Ref-2 | 1a | 1b | 1c | 1d | 2a | 2b | 2c | 2d |
|---|---|---|---|---|---|---|---|---|---|
| E21051 | 100 | 99 | 98 | 96 | 92 | 99 | 98 | 96 | 92 |
| DEM | | 1 | 2 | 4 | 8 | | | | |
| MTG | | | | | | 1 | 2 | 4 | 8 |
| TREMIN 238-600 EST | 30 | 30 | 30 | 30 | 30 | 30 | 30 | 30 | 30 |
| BLANC FIX FF | 20 | 20 | 20 | 20 | 20 | 20 | 20 | 20 | 20 |
| COLORTHERM RED | 3 | 3 | 3 | 3 | 3 | 3 | 3 | 3 | 3 |
| MT N-990 | 1 | 1 | 1 | 1 | 1 | 1 | 1 | 1 | 1 |
| ELASTOMAG 170 | 5 | 5 | 5 | 5 | 5 | 5 | 5 | 5 | 5 |
| RHENOFIT CF | 4 | 4 | 4 | 4 | 4 | 4 | 4 | 4 | 4 |
| CARNAUBA WAX wax | 0.3 | 0.3 | 0.3 | 0.3 | 0.3 | 0.3 | 0.3 | 0.3 | 0.3 |
| ARMEEN 18D | 0.3 | 0.3 | 0.3 | 0.3 | 0.3 | 0.3 | 0.3 | 0.3 | 0.3 |

Preparation of Fluoroelastomer-Metal Composites

Bonds on the surface of a steel ring were formed by injection molding. Zn-phosphated steel rings (45 mm×60 mm×10 mm; internal diameter×external diameter×height) were placed into the 45×60×10 mm cavity of a shaft seal mold built into a Desma 966.053 ZO lab injection molding machine. The mold temperature was set to reach 190° C. surface temperature of the cavity. The fluoroelastomer compound cut into strips was inserted into the mold by injection (temperature of injection nozzle was 95° C., injection pressure up to 2080 bar) and then demolded.

Determination of Bond Strength

The fluoroelastomer-metal rings were then subjected to measure the bond strength.

The fluoroelastomer layer was stripped off by using pliers. The amount of surface of the interface that was still covered by the elastomer was measured. The percentage of the surface covered divided by the total surface of the interface is expressed as % rubber tear (% RT). When the entire surface of the interface is still covered by the fluoroelastomer the rubber tear would be 100%. When no fluoroelastomer was left at the interface and the components have delaminated the rubber tear (RT) would be 0%. Therefore, the greater the percentage of rubber tear the stronger is the strength of the bond between rubber and metal, because the rubber breaks rather than withdraws from the substrate.

The results are indicated in tables 3 and 4 for reference example 2, examples 1a-d and 2a-d respectively. Five samples were prepared in each experiment and the average % RT was determined.

TABLE 3

| Experiment | REF-2 (+0 ppm DEM) | 1a (+100 ppm DEM) | 1b (+200 ppm DEM) | 1c (+400 ppm DEM) | 1d (+800 ppm DEM) |
|---|---|---|---|---|---|
| | 52 | 52 | 94 | 99 | |
| | 44 | 92 | 89 | 98 | |
| | 72 | 72 | 92 | 96 | |
| | 58 | 61 | 93 | 94 | |
| | 61 | 72 | 98 | 99 | |
| % RT - (Average) | 57 | 68 | 93 | 97 | 89 |

Table 3 indicates that the addition of a small amount of DEM increased the bond strength. The increase in bond strength appears to plateau after the addition of 200 ppm bonding promoter.

TABLE 4

| Experiment | REF-2 (+0 ppm MTG) | 2a (+100 ppm MTG) | 2b (+200 ppm MTG) | 2c (+400 ppm MTG) | 2d (+800 ppm MTG) |
|---|---|---|---|---|---|
| | 52 | 88 | 94 | 94 | 92 |
| | 44 | 81 | 98 | 92 | 86 |
| | 72 | 67 | 96 | 94 | 89 |
| | 58 | 72 | 86 | 98 | 92 |
| | 61 | 67 | 94 | 98 | 98 |

TABLE 4-continued

| Experiment | REF-2 (+0 ppm MTG) | 2a (+100 ppm MTG) | 2b (+200 ppm MTG) | 2c (+400 ppm MTG) | 2d (+800 ppm MTG) |
|---|---|---|---|---|---|
| % RT (Average) | 57 | 76 | 94 | 95 | 91 |

Table 4 indicates that the addition of a small amount of MTG increased the bond strength. The increase in bond strength appears to plateau after the addition of 200 ppm of bonding promoter.

The invention claimed is:

1. A method of bonding a fluoroelastomer to a metal substrate, said method comprises:
  i) providing a fluoroelastomer compound comprising a) one or more fluoroelastomer that is curable by a bisphenol curing and b) one or more curing agent with which the fluoroelastomer can be cured, and bringing the fluoroelastomer compound in contact with the metal substrate to form a common interface,
  ii) curing the fluoroelastomer compound in the presence of an effective amount of at least one bonding promoter, wherein the bonding promoter has a molecular weight of less than 5,000 g/mole and a boiling point of at least 150° C. at 760 Torr and is selected from saturated aliphatic or aromatic hydroxy ethers, aliphatic monoalkyl esters of an aliphatic or aromatic carboxylic acid and a combination thereof.

2. The method according to claim 1, wherein the bonding promoter is capable of reducing the glass transition temperature of the fluoroelastomer by at least 4° C. when present in the fluoroelastomer at an amount of 5% by weight based on 100% weight of fluoroelastomer.

3. The method according to claim 1, wherein the bonding promoter is present in the fluoroelastomer compound.

4. The method according to claim 1, wherein the bonding promoter is present in an amount of from about 500 ppm to about 10,000 ppm based on the weight of the fluoroelastomer.

5. The method according to claim 1, wherein the fluoroelastomer has a Mooney viscosity (ML1+10 at 120° C.) of 5 to 150.

6. A composite material comprising a fluoroelastomer component and a metal substrate, wherein the fluoroelastomer component is bonded to the metal and wherein the bond is the result of a curing reaction according to the method of claim 1.

7. An article comprising the composite material of claim 6.

8. The article of claim 7 being a seal.

* * * * *

UNITED STATES PATENT AND TRADEMARK OFFICE
CERTIFICATE OF CORRECTION

PATENT NO.         : 9,567,450 B2
APPLICATION NO.    : 14/238124
DATED              : February 14, 2017
INVENTOR(S)        : Kai Helmut Lochhaas It is certified that error appears in the above-identified patent and that said Letters Patent is hereby corrected as shown below:

On the Title Page

Column 1 (Title)
Line 5, Delete "HYDROCARDONS" and insert -- HYDROCARBONS --, therefor.

In the Specification

Column 1
Line 5 (Title), Delete "HYDROCARDONS" and insert -- HYDROCARBONS --, therefor.

Column 2
Line 22, Delete "fluoroelestomer" and insert -- fluoroelastomer --, therefor.

Column 4
Line 1, Delete "beonzoeic" and insert -- benzoic --, therefor.
Line 3-4, Delete "dibutylphtalates" and insert -- dibutylphthalates --, therefor.

Column 5
Line 36, Delete "fluroelastomer" and insert -- fluoroelastomer --, therefor.

Column 6
Line 64, Delete "by" and insert -- be --, therefor.

Column 12
Line 1, Delete "tetraphthalamide;" and insert -- terephthalamide --, therefor.

Column 14
Line 58, Delete "preventors." and insert -- preventers. --, therefor.

Signed and Sealed this
First Day of August, 2017

Joseph Matal
*Performing the Functions and Duties of the
Under Secretary of Commerce for Intellectual Property and
Director of the United States Patent and Trademark Office*

Column 16
Line 30 (Approx.), Delete "fluorolelastomer" and insert -- fluoroelastomer --, therefor.
Line 35 (Approx.), Delete "fluorolelastomer" and insert -- fluoroelastomer --, therefor.
Line 57, After "fluoroelastomer" insert -- . --.

Column 18
Line 2-3, Delete "fluoroelestomer" and insert -- fluoroelastomer --, therefor.

Column 19
Line 19 (TABLE 1), Delete "Trieethylphosphate" and insert -- Triethylphosphine --, therefor.

In the Claims

Column 22
Line 19-20, In Claim 6, delete "fluoroelestomer" and insert -- fluoroelastomer --, therefor.